F. R. BRUGGER.
STREET SWEEPER.
APPLICATION FILED AUG. 27, 1912.
1,097,911.
Patented May 26, 1914.
3 SHEETS—SHEET 1.
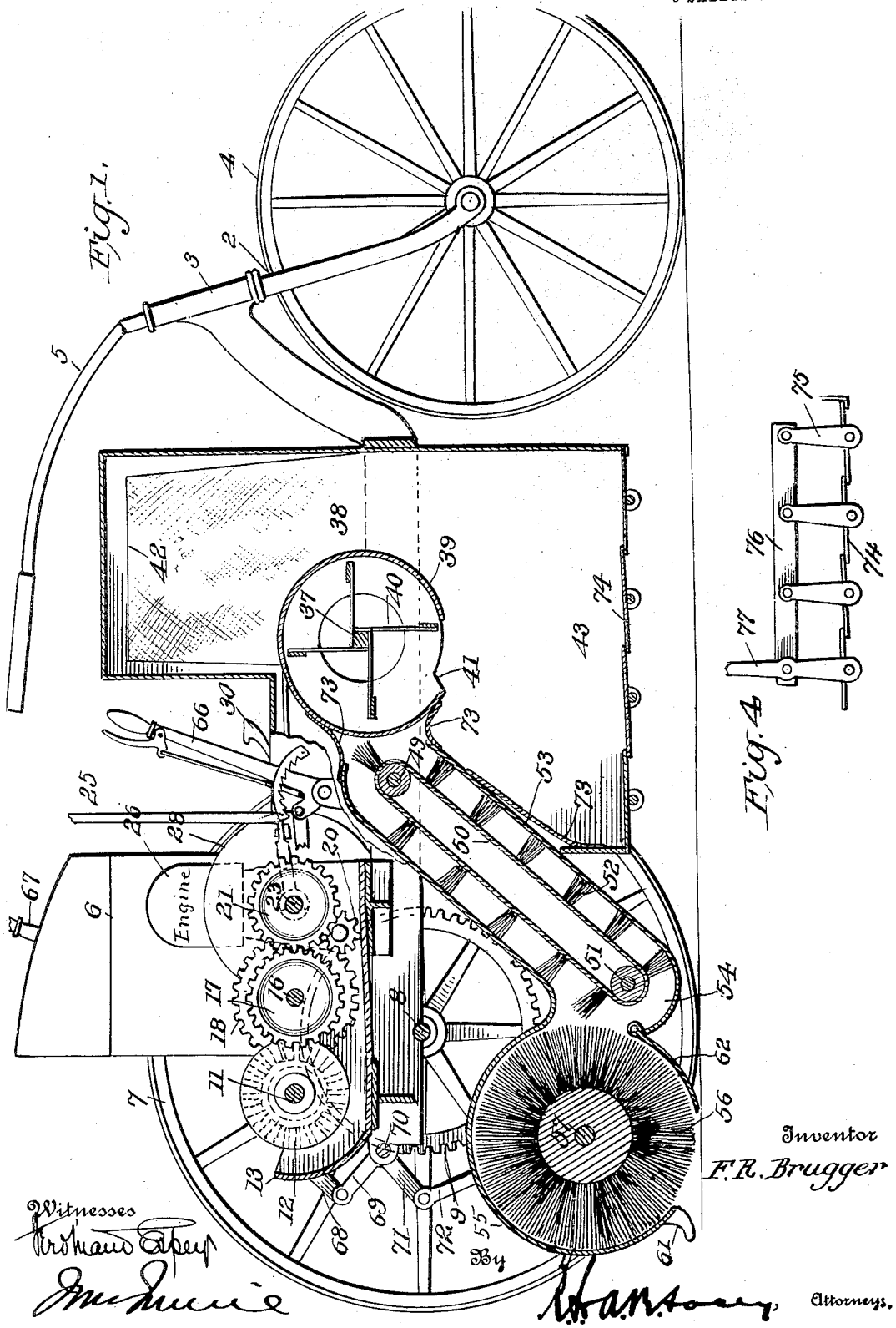
Witnesses
Inventor
F. R. Brugger
By
Attorneys.

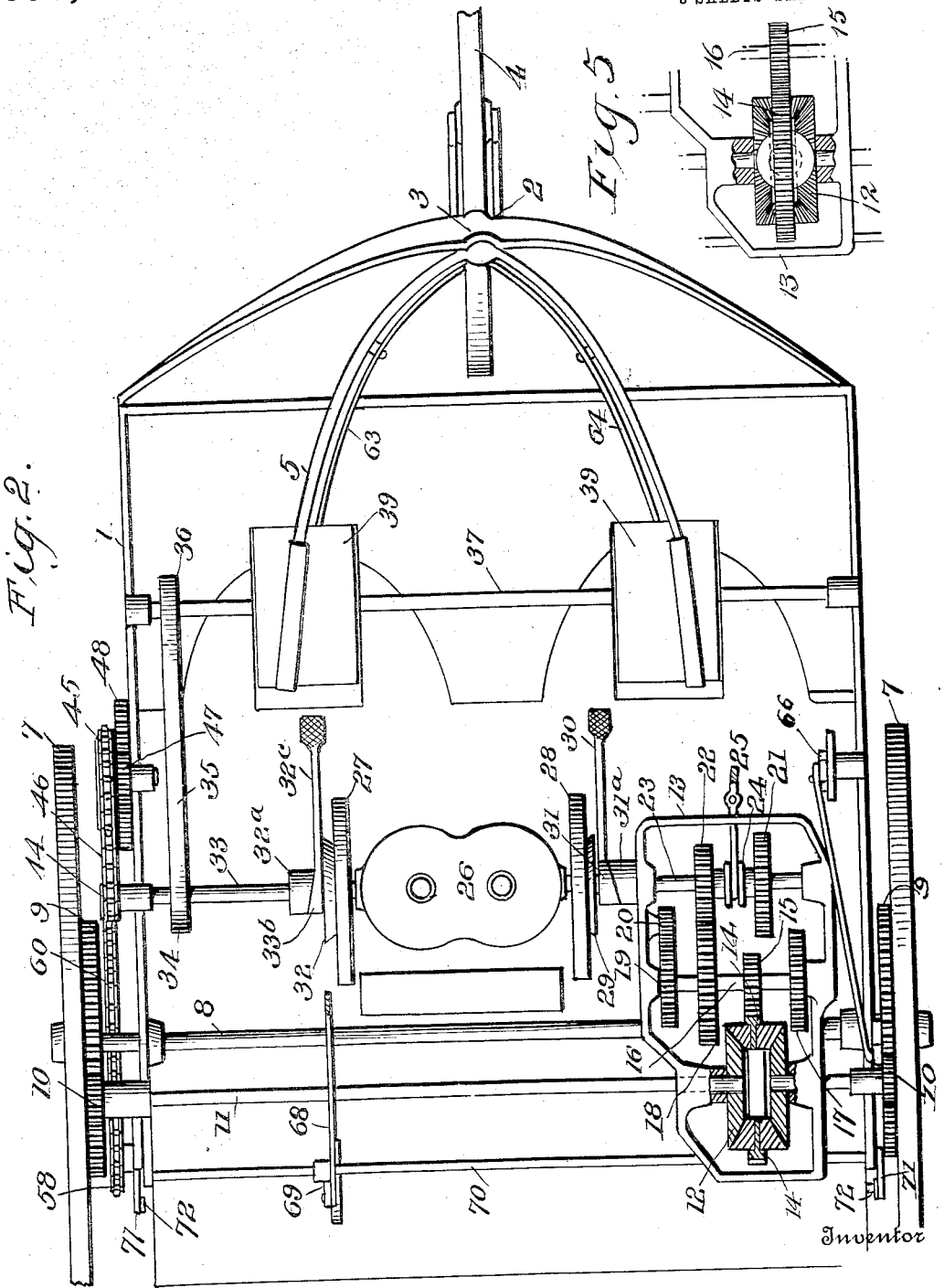

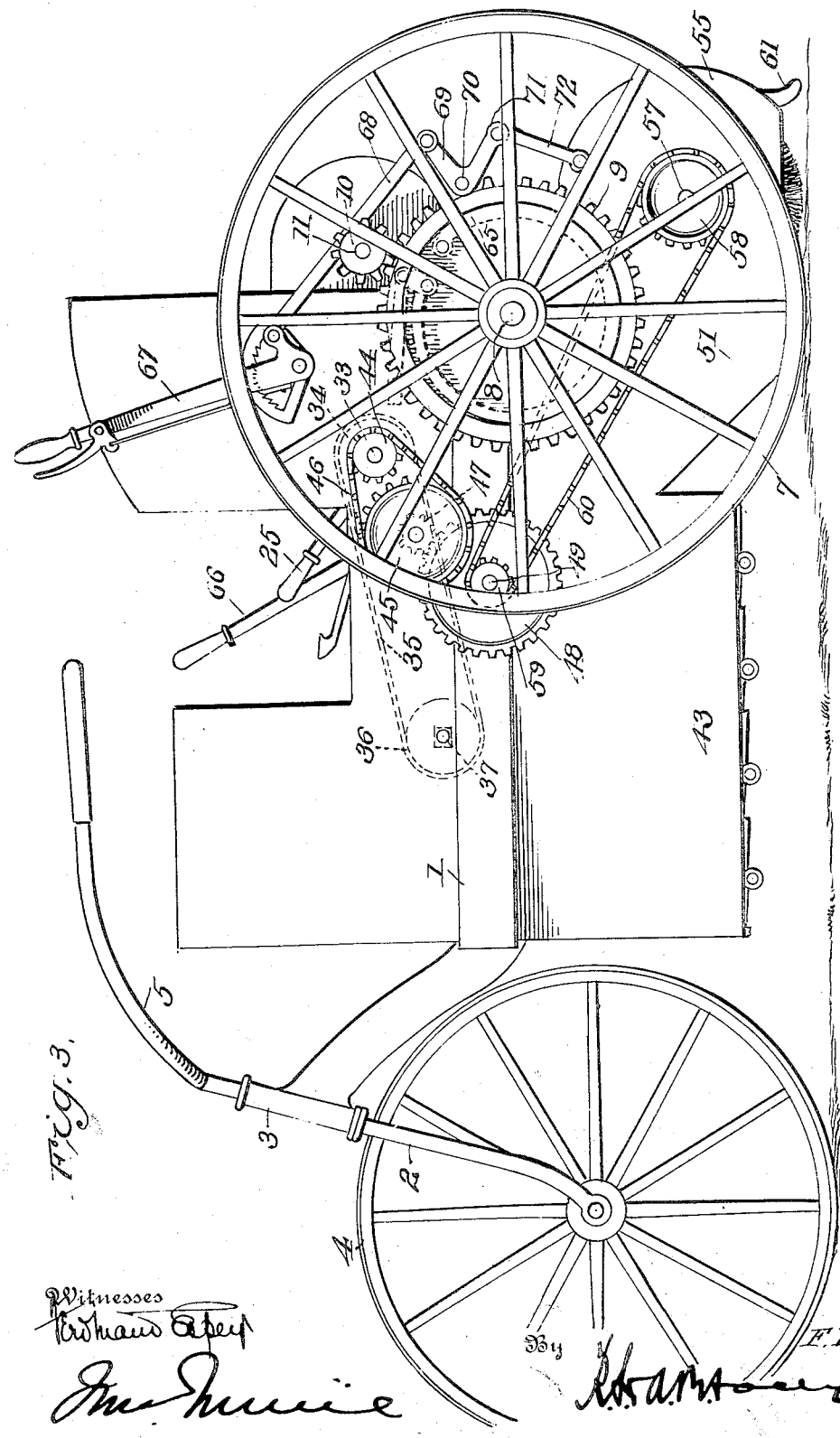

UNITED STATES PATENT OFFICE.

FREDERICK R. BRUGGER, OF LAKE CITY, IOWA.

STREET-SWEEPER.

1,097,911. Specification of Letters Patent. Patented May 26, 1914.

Application filed August 27, 1912. Serial No. 717,388.

*To all whom it may concern:*

Be it known that I, FREDERICK R. BRUGGER, citizen of the United States, residing at Lake City, in the county of Calhoun and State of Iowa, have invented certain new and useful Improvements in Street-Sweepers, of which the following is a specification.

This invention relates to street sweepers, and has for its object the provision of a motor propelled machine which may be produced at a low cost and which, when in use, will be easily operated and will effectually remove from streets, pavements, or other surfaces all dust and dirt deposited thereon.
The invention is illustrated in the accompanying drawings and will be hereinafter first fully described, the novel features being subsequently pointed out in the claims following the description.
In the drawings: Figure 1 is a sectional elevation of a street sweeper embodying my invention; Fig. 2 is a plan view of the same with the seat and the upper portion of the dust chambers removed; Fig. 3 is a side elevation; Fig. 4 is a detail showing the manner of dumping the dust pan. Fig. 5 is a detail view of the differential gear.

In carrying out my invention, I employ a frame 1 of suitable dimensions having a fork 2 mounted in a steering head 3 at its front end, said fork carrying a steering wheel 4 and being equipped with handles 5 extending back to a point where they may be easily reached by the occupant of a seat 6 supported upon the frame near the rear end thereof.

Traction wheels 7 are mounted upon an axle 8 which is secured in the frame near the rear end thereof, and to the inner sides of the traction wheels, I secure large gear wheels 9, as clearly shown. These gear wheels 9 are in mesh with pinions 10 secured upon a shaft 11 which is journaled in suitable bearings upon the frame in rear of the axle and is provided at an intermediate point of its length with a differential gear, indicated at 12, the housing 13 for said gear being shown broken away. Motion is imparted to the differential gear, so as to rotate the shaft 11 and thereby actuate the traction wheels 7, through the spur ring 14 of said differential gear and pinion 15 which is fixed upon a transmission shaft 16, as shown. The said shaft 16 is journaled in a suitable supplemental frame or housing 13 upon the main frame and is equipped with a plurality of gears 17, 18 and 19, as shown. The gear 19 meshes with a pinion 20 fitted upon a stub-shaft which is mounted upon the side of the housing 13, and the gears 17 and 18 are adapted to be engaged by gear wheels 21 and 22, respectively, which are keyed or otherwise fitted upon the engine driving shaft 23 so that they may be shifted longitudinally of the said driving shaft but will be forced to rotate with the same. These gears are connected by a grooved collar 24 which is engaged by a yoke connected with a suitable operating lever 25 whereby the collar may be moved longitudinally of the driving shaft and thereby actuated to bring the gear 22 into mesh with the gear 18 or with the pinion 20 or to bring the gear 21 into mesh with the gear 17. When the gear 22 meshes with the gear wheel 18, the machine will be driven forward at a low speed and when the gear 21 meshes with the gear 17, it will be driven forward at a higher speed. If the gear 22 be brought into mesh with the pinion 20, the direction of movement will be reversed and the machine may then be backed into the barn or other place of storage.

The engine, indicated at 26, is equipped with fly wheels 27 and 28 at its opposite sides, and the driving shaft member 23 is adapted to be connected to the fly wheel 28 so as to rotate therewith by a friction clutch 29 controlled by means of a foot lever 30 and opposed cams 31, 31ª, the cam 31 being formed on the end of the lever and the cam 31ᵃ being formed on the housing 13 around the shaft. The fly wheel 27 is connected through a friction clutch 32 with a shaft member 33 upon which is secured a pulley 34 connected by a belt 35 with a pulley 36 fixed upon the fan shaft 37. The clutch 32 is operated through opposed cams 32ᵃ, 32ᵇ, which are controlled by a foot lever 32ᶜ. The fan shaft 37 is journaled in suitable bearings upon the frame and extends through the dust chamber 38, as shown. Within the dust chamber are fan casings 39 and within the said fan casings are mounted fans 40 of any preferred form, the fan casings being provided with discharge openings 41 projected toward the bottom of the dust chamber and textile dust retainers 42 are secured within the dust chambers so that the fine particles of dust will be arrested and caused to drop to the receptacle 43 below the dust chamber, while the air passing through the meshes of the retainers may escape to the rear over the fan casings and play upon the engine to cool the cylinder thereof, as will be readily understood. The shaft member 33 is extended beyond the side of the main frame and is equipped at its extremity with a sprocket wheel 44 around which, and a sprocket wheel 45, is trained a chain 46. The sprocket wheel 45 is fixed upon a stub-shaft journaled in the side of the frame, and the said shaft carries a pinion 47 meshing with a gear wheel 48 which is keyed upon a shaft 49 journaled upon the frame below the stub-shaft and extending entirely across the machine near the rear of the dust-pan or dirt receptacle 43, as will be readily understood on reference to Fig. 1. An endless belt 50 passes around the said shaft 49 and a roller 51 below and in rear thereof, and the said belt carries a plurality of brushes 52 which are adapted to ride upwardly upon a partition 53 which leads up to and forwardly beyond the rear wall of the receptacle 43, as shown. The lower end of the partition 53 is curved upwardly and rearwardly to form a trough 54 and the dirt deposited in said trough will be swept up the partition by the brushes 52 and discharged in the receptacle 43, as will be readily understood. The roller 51 is journaled in the sides of a supplemental casing of which the partition 53 and trough 54 form a part, and the said casing is enlarged at the rear of the machine to constitute a cylinder 55 within which is housed the broom or brush 56. The said broom or brush is carried by a shaft 57 which is journaled in the ends of the cylinder and is equipped with a sprocket wheel 58 around which and a sprocket pinion 59 on the end of the shaft 49, is trained a chain 60 whereby the brush will be rotated in a direction opposite to the direction of rotation of the traction wheels. The cylinder 55 is provided at its rear with a shoe 61 adapted to ride over the surface being cleaned and thereby serve as a buffer to prevent bending or other damage to the cylinder and the brush or broom therein as the machine is caused to travel over a rough surface. The cylinder 55 is, of course, open at the bottom of the machine so that the brush may project therethrough to come into contact with the surface to be cleaned, and in advance of the brush an apron 62 is fitted upon the rear edge of the trough and depends therefrom to serve as a guide or deflector so that the particles of matter taken up by the brush will be directed into the trough 54 as the brush moves over the apron, as will be readily understood.

The handle bars 5 carry the spark and throttle controlling levers 63 and 64 and these members may be of the usual or any preferred form.

The engine 26 is disposed below the seat to economize room and the fuel tank, ignition controller, and other accessories of the engine will be likewise disposed under the seat. The gear wheel 9 at the right of the machine is hollow or recessed in its inner face to accommodate a brake band 65 which is expanded against the inner surface of the rim of the wheel by a lever 66 mounted on the main frame adjacent the seat and connected with the free end of the band by a link and crank arms, as indicated in Fig. 1 and as will be readily understood. Mounted upon one side of the seat-supporting frame, is a lever 67 which is connected by a link 68 with a crank arm 69 rising from a rock shaft 70 journaled in suitable bearings at the rear end of the main frame and provided at its ends with rearwardly projecting crank arms 71 which are connected by the links 72 with the cylinder 55.

It will be readily seen from the foregoing description, taken in connection with the accompanying drawings, that if the clutches 29 and 32 be shifted into engagement with the adjacent fly wheels the several mechanisms will be driven so that the machine will be caused to travel forwardly and the brush or broom 56 will be rotated to remove the particles of dirt from the surface over which the machine travels and sweep the said particles up the apron 62 into the trough 64. The elevating brushes 52 will then act upon the said particles and carry them up the partition 53 and discharge them into the receptacle 43, while the fans 40 will create a suction through the elevator to prevent the escape of dust from below the broom and to take up dust that the broom would pass over. The casing of the elevator is connected to the fan casings and to the dust pan by flexible curtains 73 so that the air currents will not be dissipated nor diverted and the dust permitted to escape as the elevator vibrates in passing over a rough surface. If the receptacle 43 has been filled, the gear 22 is moved out of mesh with the gear 18 and the gear 21 simultaneously moved into mesh with the gear 17. The clutch 32 is then released from the fly wheel 27 whereupon the machine will be caused to travel forwardly at a higher speed without operating the fans and the contents of the receptacle may be discharged at the dump. To facilitate such discharge, the bottom of the pan is composed of a series of oscillatory overlapping slats 74 carried by rock shafts which are equipped with crank arms 75, said crank arms being connected by a link 76 from which rises a handle 77 whereby if the handle be vibrated all the slats will be rocked to open or close the bottom of the pan.

When the machine is being driven to the place of deposit, the brush or broom may be swung upwardly by manipulating the lever 67 so that it will not come in contact with the pavement and the sweeping operation will be thereby suspended, the casing containing the brush swinging about the shaft 49 as a center.

My improved machine is very compactly arranged and may be easily controlled so that it will be found highly efficient in use for the purposes for which it is designed.

What I claim is:—

1. In a sweeper, the combination of a frame, wheels supporting the same, a dirt chamber carried by and depending from the front portion of the frame, upper and lower parallel inclined walls extending downwardly and rearwardly from said dirt chamber and disposed below the frame, a transverse cylinder below the frame in rear of said walls and having an opening communicating directly with the space between said walls, a brush within said cylinder, a conveyer arranged between said parallel walls, a fan disposed within the dirt chamber at the upper end of the lower inclined wall and communicating with the space between said walls, and means on the frame over the transverse cylinder and the inclined walls for driving the supporting wheels, the brushes and the fan.

2. In a sweeper, the combination of a wheel-supported frame, a dirt chamber carried by said frame, an inclined partition extending downwardly and rearwardly from the dirt chamber, a cylindrical casing at the rear end of said partition, a wall extending from said casing parallel with the partition, a brush within said casing, an elevator moving between the partition and the wall parallel therewith, a fan at the upper end of the said partition and wall discharging toward the bottom of the dirt chamber, and operating mechanism for said brush, elevator and fan.

3. In a sweeper, the combination of a wheel-supported frame, a dirt receptacle mounted on the frame, a fan discharging toward the bottom of the dirt receptacle, an elevator leading upwardly through the rear wall of the dirt receptacle and having its upper end disposed adjacent the fan, a rotary brush at the lower end of the elevator, and means for operating said brush, the elevator and the fan.

4. In a sweeper, the combination of a frame, wheels supporting the frame, a motor mounted on said frame, gearing connecting said motor with some of the supporting wheels to rotate the same, a brush disposed below said gearing, an elevator leading upwardly and forwardly from said brush and also disposed below said gearing, a fan at the upper end of the elevator, a dirt receptacle having its walls inclosing the fan and the upper end of the elevator, and means actuated by the motor for operating the brush, the elevator and the fan.

In testimony whereof I affix my signature in presence of two witnesses.

FREDERICK R. BRUGGER. [L. S.]

Witnesses:
L. E. NOKES,
E. W. TOWNSEND.